(12) United States Patent
Ramsl et al.

(10) Patent No.: US 10,380,163 B2
(45) Date of Patent: Aug. 13, 2019

(54) DOMAIN SIMILARITY SCORES FOR INFORMATION RETRIEVAL

(71) Applicant: SAP SE, Walldorf (DE)

(72) Inventors: Hans-Martin Ramsl, Mannheim (DE); Sebastian Koehler, Heidelberg (DE)

(73) Assignee: SAP SE, Walldorf (DE)

( * ) Notice: Subject to any disclaimer, the term of this patent is extended or adjusted under 35 U.S.C. 154(b) by 215 days.

(21) Appl. No.: 15/379,442

(22) Filed: Dec. 14, 2016

(65) Prior Publication Data
US 2018/0165289 A1    Jun. 14, 2018

(51) Int. Cl.
*G06F 16/35*    (2019.01)

(52) U.S. Cl.
CPC ................... *G06F 16/35* (2019.01)

(58) Field of Classification Search
CPC ....................................................... G06F 16/35
See application file for complete search history.

(56) References Cited

U.S. PATENT DOCUMENTS

2015/0293910 A1* 10/2015 Mathur ............. G06F 17/30684
704/2

OTHER PUBLICATIONS

UM-Corpus: A Large English-Chinese Parallel Corpus for Statistical Machine Translation written by Liang Tian, published 2014 in LREC, p. 1837-1842, (Year: 2014).*

Amit Singal; Modern information retrieval: A brief overview; 2001; IEEE Data Eng. Bull. vol. 24, No. 4, pp. 35-43; IEEE, New Jersey, USA; (http://160592857366.free.fr/joe/ebooks/ShareData/Modern%20Information%20Retrieval%20-%20A%20Brief%20Overview.pdf).

Christian S. Perone; Machine Learning: Cosine Similarity for Vector Space Models (Part III); Terra Incognita; Dec. 9, 2013; Blog published by WordPress; (http://blog.christianperone.com/2013/09/machine-learning-cosine-similarity-for-vector-space-models-part-iii/).

Georgiana Dinu and Mirella Lapata; Topic models for meaning similarity in context; In Proceedings of the 23rd International Conference on Computational Linguistics: Posters (pp. 250-258); Aug. 2010; Association for Computational Linguistics, Stroudsburg, PA, USA; (http://www.aclweb.org/anthology/C10-2029).

Nikolaos Aletras and Mark Stevenson; Measuring the Similarity between Automatically Generated Topics; In Proceedings of the 14th Conference of the European Chapter of the Association for Computational Linguistics, pp. 22-27; Apr. 2014; Association for Computational Linguistics, Stroudsburg, PA, USA; (http://www.aclweb.org/anthology/E14-4005).

(Continued)

*Primary Examiner* — Robert W Beausoliel, Jr.
(74) *Attorney, Agent, or Firm* — Fish & Richardson P.C.

(57) ABSTRACT

Various embodiments of systems, computer program products, and methods to provide domain similarity scores for information retrieval are described herein. In an aspect, a plurality of files associated with a plurality of domains are retrieved. A corpus corresponding to the plurality of domains is generated based on the plurality of files by integrating the plurality of files corresponding to the plurality of domains. Further, similarity scores between the plurality of domains are determined based on the generated corpus. The similarity scores between the plurality of domains are persisted in a similarity scores repository to enable information retrieval during translating data between different languages.

20 Claims, 5 Drawing Sheets

(56) References Cited

OTHER PUBLICATIONS

Joerg Tiedemann; Automatic construction of weighted string similarity measures; In Proceedings of the Joint SIGDAT Conference on Empirical Methods in Natural Language Processing and Very Large Corpora (pp. 213-219); 1999; Association for Computational Linguistics, Stroudsburg, PA, USA; (http://www.aclweb.org/anthology/W99-0626.pdf).

Donald E Knuth, James H Morris. Jr and Vaughan R. Pratt; Fast pattern matching in strings; SIAM journal on computing, vol. 6, No. 2, pp. 323-350; Jun. 1977; Department of Computer Science, Johns Hopkins Whiting School of Engineering, Baltimore, Maryland, USA; (https://www.cs.jhu.edu/~misha/ReadingSeminar/Papers/Knuth77.pdf).

* cited by examiner

DOMAIN SIMILARITY SCORES FOR INFORMATION RETRIEVAL

BACKGROUND

Information retrieval (IR) refers to obtaining information relevant to a request from a collection of information resources via communication networks (e.g., the Internet, intranets and extranets). Search engines have been developed to facilitate IR on a network. Different types of applications that involve IR are available. One such type of applications is a translation system (e.g., translation hub services), which is used to provide users in a global market with texts in their own languages. Therefore, while developing an application to support different languages, the translation system may be used to translate texts from one language (e.g., English) to others languages (e.g., German and Spanish) by submitting property files in one language (e.g. English). During such translations, domains (e.g., subject areas such as "payroll", "finance", "human resource" and the like) may have to be considered as texts or terms or words may have different meanings in different domains.

For example, when translation for English term "exchange" into German in a specific domain (e.g., "payroll") is received, the search space is limited to the language (e.g., German) and the domain (e.g., "payroll"). When there exists German translation for "exchange" in the domain "payroll", the translation is retrieved (e.g., in-domain search). When the translation is not available in the domain "payroll", the search space may be extended to other domains (e.g., cross-domain search). Even though there can be an advantage of potentially delivering a result, quality of the result may be affected.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

DETAILED DESCRIPTION

Embodiments of techniques to provide domain similarity scores for information retrieval are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted. Further, it is to be understood that the various actions (retrieving, determining, transmitting, rendering, triggering and so on) may be performed by a hardware device (e.g., computing system), even if the action may be authorized, initiated or triggered by a user, or even if the hardware device is controlled by a computer program, software, firmware, and the like.

Figure 1:
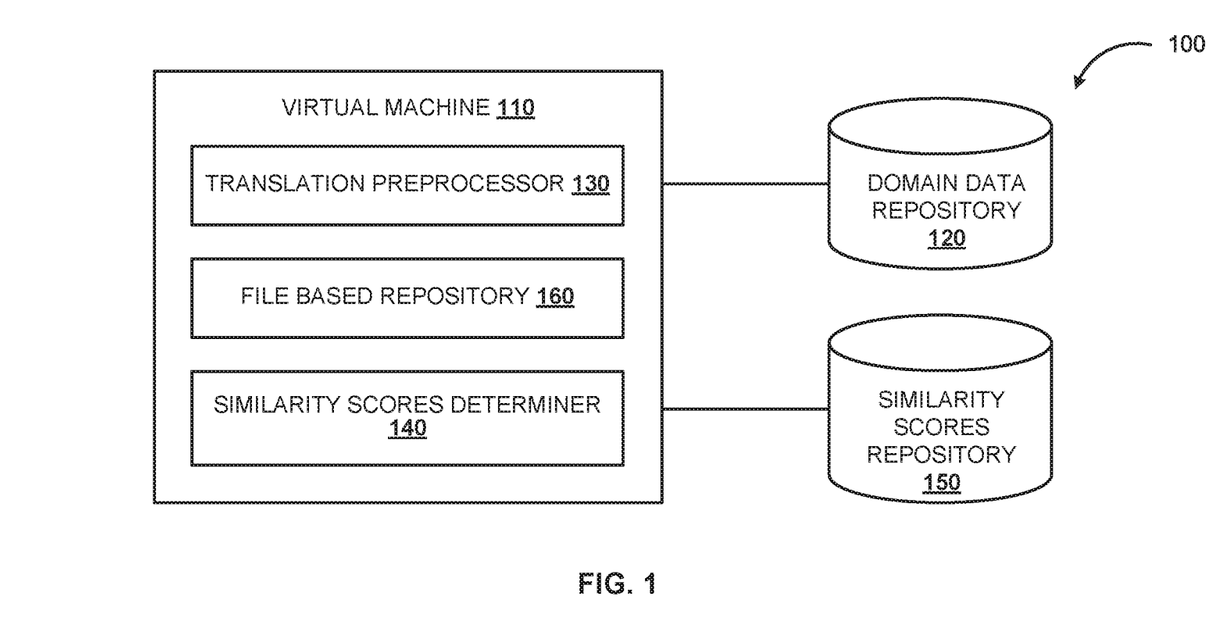
FIG. 1 is a block diagram of a computing environment illustrating domain similarity scores for information retrieval, according to one embodiment.

FIG. 1 is a block diagram of a computing environment illustrating determining similarity scores for information retrieval, according to one embodiment. In a global market, an application may have to be user friendly by supporting different languages for global users. In this regard, a translation system (e.g., SAP® Translation Hub) may be used while developing the application to support different languages. The translation system can translate short texts or words or terms in the application from one language into additional languages. Further, while performing translations, a domain in which the translation word is requested may have to be considered as words may have different meanings in different domains. The domain can be referred to as a subject area or a concept or a topic or a particular area. For example, a domain can be, but not limited to, an application domain (e.g. "finance" domain), a product (e.g. "SAP® Business ByDesign®"), a company activity (e.g. "marketing"), and a company organizational unit (e.g. "Ariba®"). Other examples for the domain can be, but not limited to "payroll" domain, "Customer relationship management" domain, "human resource" domain, "sales" domain, and "travel" domain. In one embodiment, when the translation for the word in the particular domain is not present, the translation can be performed in other domains which may be similar to the particular domain. Accordingly, translation preprocessor 130 and similarity scores determiner 140 may assist in determining similarity scores between the domains.

In one embodiment, the block diagram illustrates a computer system to include virtual machine 110 communicatively connected to domain data repository 120 and similarity scores repository 150 via a network (e.g., the Internet). Both the domain data repository 120 and the similarity scores repository 150 can be in-memory databases in a cloud platform, for example. The virtual machine 110 may be considered as an emulation of the computer system. Further, the virtual machine 110 may include the translation preprocessor 130 and the similarity scores determiner 140 to determine the similarity scores between the domains. Based on the determined similarity scores between the domains, other domains having high similarity scores with the particular domain are searched to provide the translation when there is no translation available in the particular domain.

In one embodiment, the translation preprocessor 130 extracts files associated with the domains from the domain data repository 120. For example, the domain may include a number of files of different versions corresponding to applications in the domain. Further, a file may include a list of texts or words or text description or data and the like extracted from property files associated with the application. Upon extracting the files associated with the domains, the translation preprocessor 130 may remove duplicate data in the files. Thereby, data in the files is refined. Further, the refined files are stored at file based repository 160 in the virtual machine 110. Based on the refined files, the translation preprocessor 130 may generate a corpus. The corpus can be referred as a structured set of written textual documents, i.e., a document collection. The corpus may include a number of domain files or documents corresponding to the domains. A document or a domain file may include integrated files associated with the domain. For example, consider the "payroll" domain including 230 files. In the corpus, the 230 files can be integrated into a single domain file or a document associated with the "payroll" domain.

In one embodiment, the similarity scores determiner 140 determines similarity scores between the domains based on the generated corpus. For example, the similarity scores are determined using, but not limited to, cosine similarity, string similarity and topical similarity. Cosine similarity is a measure of similarity between two vectors, where vectors represent domains. For example, the domain files associated with the domains in the corpus may be used for determining the cosine similarity. The cosine similarity between two vectors (e.g., two domain files on a vector space) is a measure that calculates the cosine of the angle between them. Further, cosine of the angle between the vectors determines similarity scores. The cosine of 0° is "1", and it is less than "1" for any other angle. Thereby, the cosine measure delivers a number between "0" and "1", where "0" means that two domains are dissimilar and a score of "1" means that the domains are similar or identical. In one embodiment, the similarity scores are subsequently exposed to provide domain similarity service. Further, the similarity scores between the domains may be persisted in the similarity scores repository 150 for retrieving translation data while translating words or terms or short texts in applications into additional languages.

In one embodiment, when a request is received to retrieve translation for a word in a second language corresponding to the domain, a search is made in the domain. When there is no translation available in the domain, other domains having high similarity scores with the domain are listed. Further, the domains having high similarity scores with the domain are searched to provide the translation. Therefore, an information retrieval algorithm may be improved by integrating a mechanism that indicates similarity between different business domains. For example, when the term "exchange" does not have an entry for German language in the domain "payroll", the most similar domain to "payroll" is proposed with such an entry. In this way, the search space is intelligently extended by maintaining semantic coherence to the original domain. Thus, the quality of the retrieved results may be improved, e.g., compared to a cross-domain search.

Figure 2:
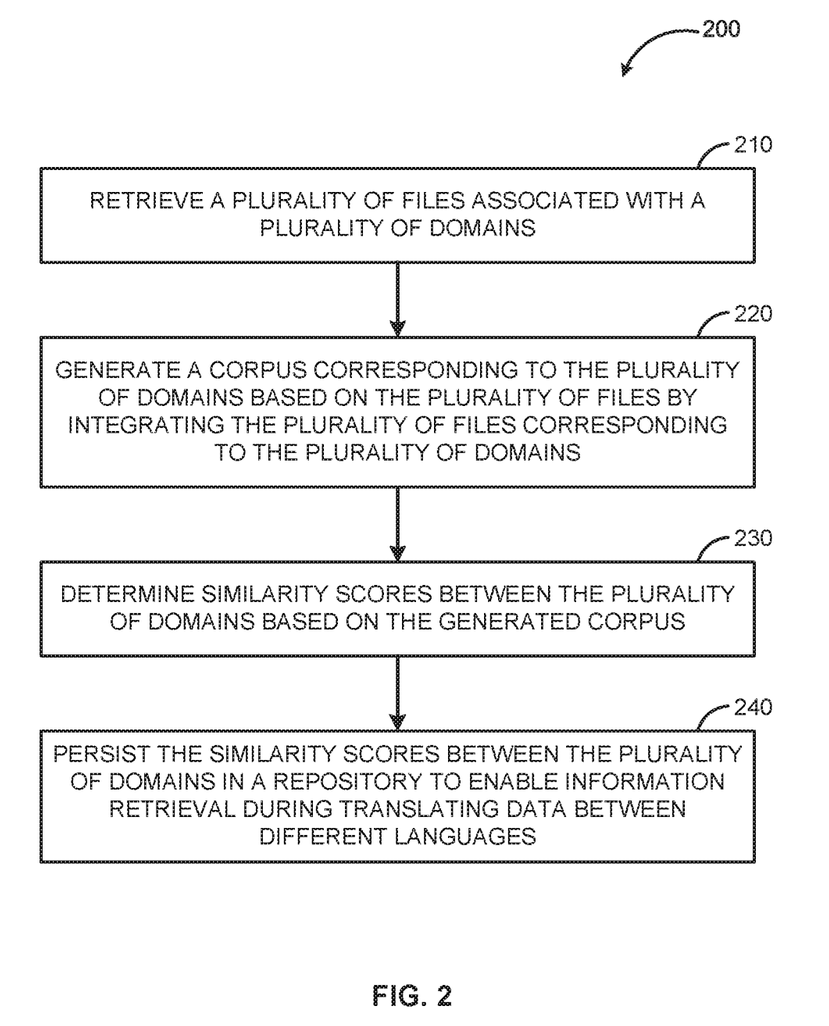
FIG. 2 is a flow diagram illustrating an example process to provide domain similarity scores for information retrieval, according to an embodiment.

FIG. 2 is a flow diagram illustrating example process 200 to provide domain similarity scores for information retrieval, according to an embodiment. At 210, files (e.g., one or more versioned) files) associated with domains are retrieved. The domain can be referred to as a subject area such as, but not limited to, "payroll" domain, "Customer relationship management" domain, "human resource" domain, "sales" domain, and "travel" domain. The files associated with the domains may include a list of texts or words extracted from property files associated with applications. Upon extracting the files associated with the domains, duplicate data in the files may be deleted.

At 220, a corpus corresponding to the domains is generated based on the files. In the corpus, the files associated with the domain are integrated to a domain file or a document. For example, when the "payroll" domain includes 230 files upon refining, the 230 files may be integrated into a single domain file. Therefore, the corpus may include a number of domain files or documents associated with the domains.

At 230, similarity scores between the domains are determined based on the generated corpus. The similarity scores can be determined by using one of cosine similarity, string similarity and topical similarity. For example, when the cosine similarity is implemented, the corpus may be used to create a vector space. To create the vector space, the list or dictionary of words present in the domain files of the corpus is listed (e.g., the words from the domain files are selected and converted them to a dimension in the vector space). The similarity scores between two domains are determined by a geometric distance of the two domains in the vector space. The domain files (e.g., domains) are represented as vectors in the vector space. By determining the cosine of the angle between the two vectors, the similarity score is obtained. Cosine similarity may generate a metric that indicate how related are two domains by the cosine angle, for example.

At 240, the similarity scores between the domains are persisted or stored in a similarity scores repository to enable information retrieval during translating data between different languages. In one embodiment, the similarity scores are subsequently exposed to provide domain similarity service (e.g., Microservice). Microservices can be referred to as a specialization of and implementation approach for service-oriented architectures (SOA), used to build flexible and independently deployable software systems. Further, the stored similarity scores between the domains may be used for retrieving translation data while translating words or terms or short texts in applications into additional languages. For example, the similarity scores can be accessed by a similarity library implemented as Server-side JavaScript® (XSJS) libraries service. The similarity library can be used within a similarity Microservice. For a given domain, the domain similarity scores persisted in the similarity scores repository can be accessed to retrieve the most similar domain(s) based on ranked similarity scores, for example. Also, the similarity library can be integrated into other services that run on the XSJS server. For example, the similarity scores between the domains, which are persisted in the similarity scores repository can be used for other services that may benefit from similar domain information, such as, but is not limited to domain clustering for domain analysis.

Figure 3:
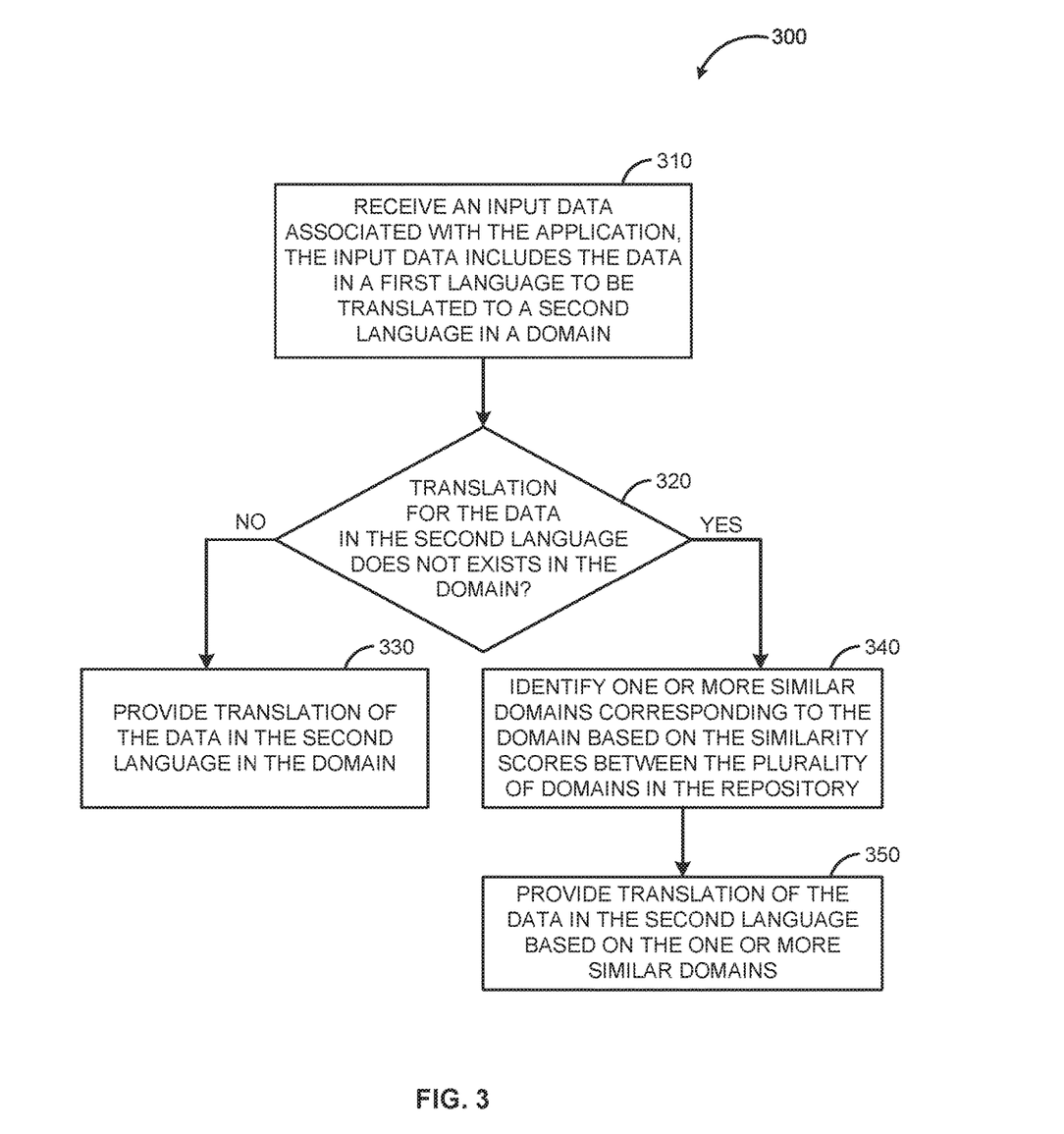
FIG. 3 is a flow diagram illustrating an example process of information retrieval based on domain similarity scores, according to an embodiment.

FIG. 3 is a flow diagram illustrating an example process of information retrieval based on the domain similarity scores, according to an embodiment. At 310, an input data associated with the application is received. The input data may include the data in a first language to be translated to a second language in a domain. For example, a request for a translation for a term "cancel" in English into German in the "payroll" domain is received.

At 320, a check is made to determine whether translation for the data in the second language does not exists in the domain. For example, a check is made to determine whether the translation for the term "cancel" in German exists in the specified "payroll" domain.

At 330, when the translation for the data in the second language exists in the domain, the translation in the second language is provided. For example, the translation for the term "cancel" in German exists in the "payroll" domain, the translation is provided. At 340, when the translation for the data in the second language does not exists in the domain, one or more similar domains corresponding to the domain are identified based on the similarity scores between the domains in the repository. For example, the translation for the term "cancel" in German does not exists in the domain "payroll", other domain which are similar to the domain "payroll" are identified based on the similarity scores between the domain.

At 350, the translation of the data in the second language is provided based on the one or more similar domains. For example, when the similarity score between the "payroll" and "finance" domains is "1", the translation of the term "cancel" in German is retrieved from the "finance" domain as the "payroll" and "finance" domains are identical or similar based on the similarity scores.

Figure 4:
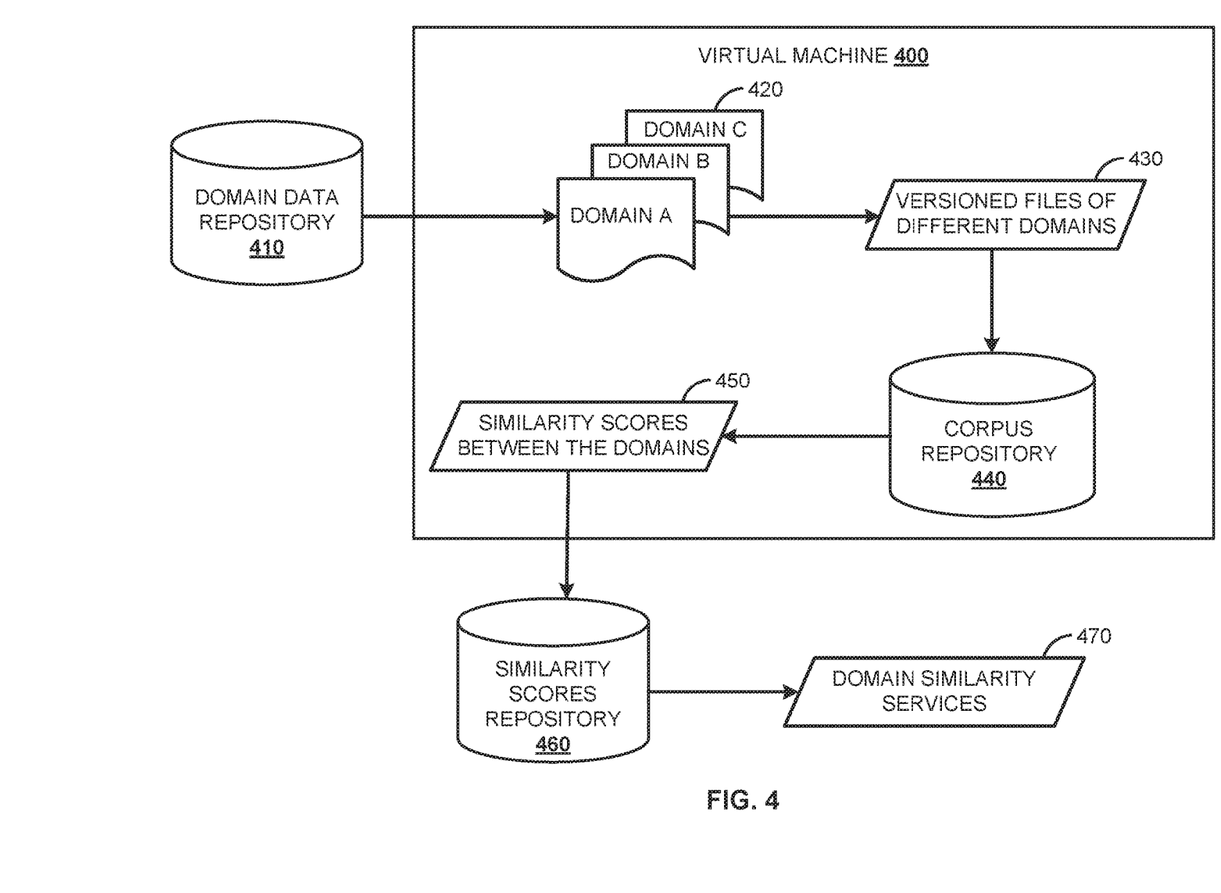
FIG. 4 is a sequence diagram illustrating an example data flow between a virtual machine, a domain data repository, and a similarity scores repository, according to an embodiment.

FIG. 4 is a sequence diagram illustrating an example data flow between virtual machine 400, domain data repository 410 and similarity scores repository 460, according to an embodiment. The sequence diagram represents the interactions and the operations involved between the virtual machine 400, the domain data repository 410 and the similarity scores repository 460. The arrows represent the process steps between the process objects (e.g., the virtual machine 400, the domain data repository 410 and the similarity scores repository 460).

In one embodiment, files (e.g., 420) associated with domains (e.g., domain A, domain B, and domain C) are extracted from the domain data repository 410. The domains can be referred as subject areas of applications. Upon extracting the files associated with the domains (e.g., domain A, domain B, and domain C), duplicate data in the files are removed. Thereby, data in the files is refined (e.g., 430). Further, based upon the refined files, a corpus is generated. In the corpus, the files associated with the domains are integrated and stored in corpus repository 440. For example, when the domain A includes 100 files upon refining, the 100 files are integrated into a single domain file or a document.

In one embodiment, the similarity scores determiner determines similarity scores between the domains (e.g., domain A, domain B, and domain C) based on the generated corpus (e.g., 450). For example, the similarity scores are determined using, but not limited to, cosine similarity, string similarity and topical similarity. Cosine similarity is a measure of similarity between two vectors, where vectors represent domains. Thereby, the cosine measure delivers a number between "0" and "1", were "0" means that two domains are dissimilar and a score of "1" means that the domains are similar or identical. Further, the similarity scores between the domains (e.g., domain A, domain B, and domain C) are stored in the similarity scores repository 460. In one embodiment, the similarity scores are subsequently exposed to provide domain similarity service (e.g., 470). For example, when a translation service is called and when no translations have been found for a given terminology domain, a ranked list of related terminology domains for the given terminology domain can be provided to facilitate better translations compared to a cross-domain search, for example.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 5:
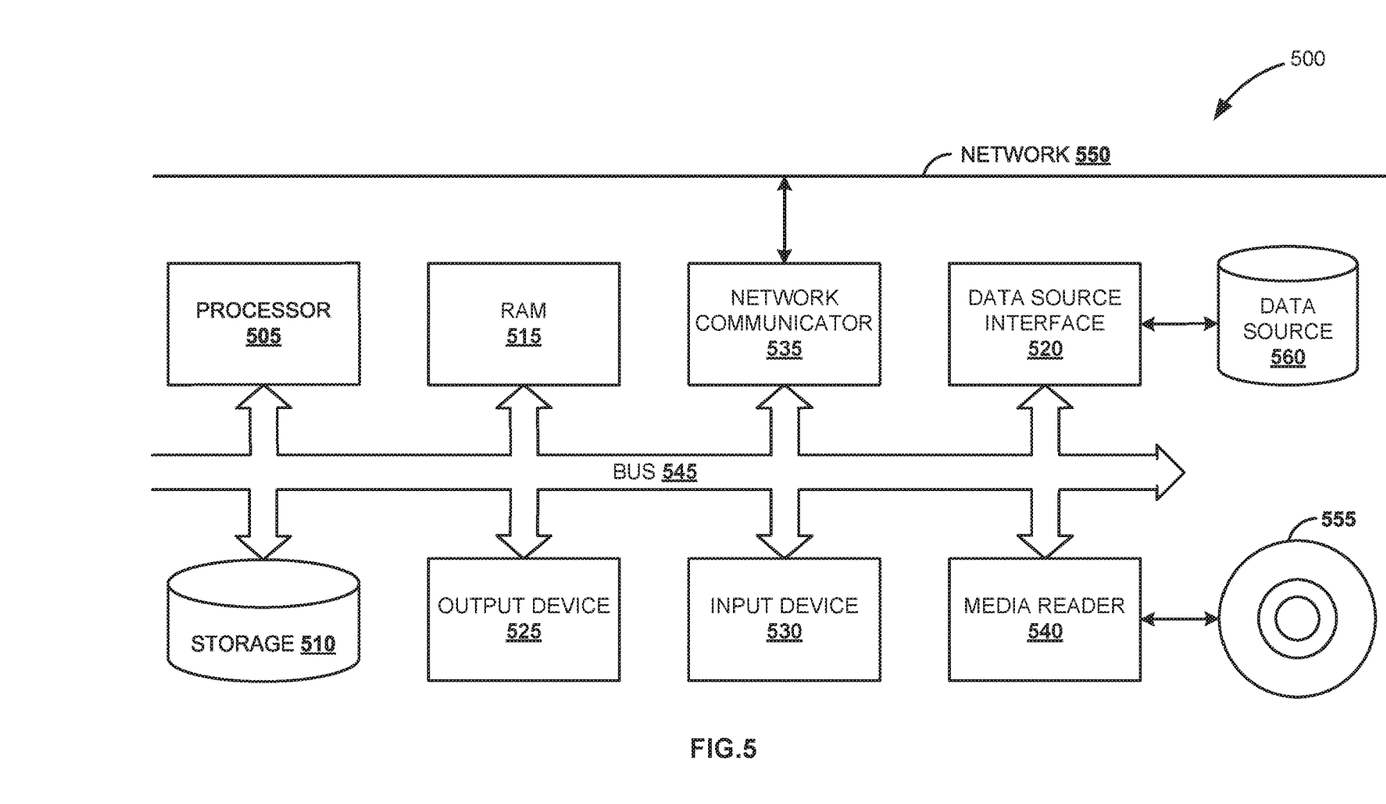
FIG. 5 is a block diagram illustrating an example computer system, according to an embodiment.

FIG. 5 is a block diagram of example computer system 500, according to an embodiment. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have storage capacity to store much of the data required for processing in the RAM 515 instead of in the storage 510. In some embodiments, the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. One or more of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments, the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer-readable storage medium storing instructions, which when executed by a computer cause the computer to:
   retrieve a plurality of files associated with a plurality of domains;
   generate a corpus including a plurality of integrated domain files corresponding to the plurality of domains based on integrating the plurality of files associated with the plurality of domains;
   determine similarity scores between the plurality of domains based on the generated corpus, wherein a similarity score from the similarity scores between a first domain and a second domain from the plurality of domains is determined based on a geometric distance between the two domains in a vector space defined by corresponding two integrated domain files from the corpus;
   persist the similarity scores between the plurality of domains in a similarity scores repository to enable information retrieval during translating data between different languages; and
   when there is no data available for translating received data in a requested domain, search into a different domain from the plurality of domains associated with high similarity score to the requested domain, according to the persisted similarity scores, to provide a semantically coherent translation for the received data with the requested domain.

2. The non-transitory computer-readable medium of claim 1, further comprising instructions, which when executed by the computer cause the computer to:
   receive the input data associated with an application under development, wherein the input data comprises the data in a first language to be translated to a second language in the requested domain, wherein the retrieved plurality of files is extracted from property files associated with the application, and wherein the data to be translated has different meaning in the requested domain compared to at least one other domain from the plurality of domains;
   identify one or more similar domains corresponding to the domain based on the similarity scores between the plurality of domains in the repository when the translation for the data in the second language does not exists in the domain, wherein the one or more similar domains are semantically coherent to the requested domain; and provide translation of the data in the second language based on searching into the one or more similar domains.

3. The non-transitory computer-readable medium of claim 2, wherein when translation for the data in the second language exists in the domain associated with the input data, provide the translation of the data in the second language corresponding to the requested domain.

4. The non-transitory computer-readable medium of claim 1, further comprising instructions, which when executed by the computer cause the computer to:
delete duplicate data from the retrieved plurality of files to generate the plurality of integrated domain files correspondingly associated with the plurality of domains.

5. The non-transitory computer-readable medium of claim 1, wherein the geometric distance is cosine similarity, string similarity, or topical similarity.

6. The non-transitory computer-readable medium of claim 1,
wherein the vector space is created based on selection and conversion of words included in lists of words present in the integrated domain files into dimensions of the vector space,
wherein the plurality of integrated files correspondingly associated with the plurality of domains are represented as vectors in the vector space, and
wherein the similarity score between the two domains is determined according to the geometric distance of two vectors in the vector space corresponding to the two domains.

7. The non-transitory computer-readable medium of claim 1, further comprising:
when there is no data available for translating the received data in the requested domain, providing a ranked list of related domains from the plurality of domains based on the determined similarity scores.

8. A computer implemented method to provide domain similarity scores for information retrieval, comprising:
retrieving a plurality of files associated with a plurality of domains;
generating a corpus including a plurality of integrated domain files corresponding to the plurality of domains based on integrating the plurality of files associated with the plurality of domains;
determining the similarity scores between the plurality of domains based on the generated corpus, wherein a similarity score from the similarity scores between a first domain and a second domain from the plurality of domains is determined based on a geometric distance between the two domains in a vector space defined by corresponding two integrated domain files from the corpus;
persisting the similarity scores between the plurality of domains in a repository to enable information retrieval during translating data between different languages; and
when there is no data available for translating received data in a requested domain, searching into a different domain from the plurality of domains associated with high similarity score to the requested domain, according to the persisted similarity scores, to provide a semantically coherent translation for the received data with the requested domain.

9. The computer implemented method of claim 8, further comprising:
receiving the input data associated with an application under development, wherein the input data comprises the data in a first language to be translated to a second language in the requested domain, wherein the retrieved plurality of files is extracted from property files associated with the application, and wherein the data to be translated has different meaning in the requested domain compared to at least one other domain from the plurality of domains;
identifying one or more similar domains corresponding to the domain based on the similarity scores between the plurality of domains in the repository when the translation for the data in the second language does not exists in the domain, wherein the one or more similar domains are semantically coherent to the requested domain; and
providing translation of the data in the second language based on searching into the one or more similar domains.

10. The computer implemented method of claim 9, wherein when translation for the data in the second language exists in the domain associated with the input data, provide the translation of the data in the second language corresponding to the requested domain.

11. The computer implemented method of claim 8, further comprising:
deleting duplicate data from the retrieved plurality of files to generate the plurality of integrated domain files correspondingly associated with the plurality of domains.

12. The computer implemented method of claim 11, wherein the plurality of files comprises a plurality of versions corresponding to the files.

13. The computer implemented method of claim 8, wherein the geometric distance is cosine similarity, string similarity, or topical similarity,
wherein the vector space is created based on selection and conversion of words included in lists of words present in the integrated domain files into dimensions in the vector space,
wherein the plurality of integrated files correspondingly associated with the plurality of domains are represented as vectors in the vector space, and
wherein the similarity score between the two domains is determined according to the geometric distance of two vectors in the vector space corresponding to the two domains.

14. The computer implemented method of claim 8, wherein the persisted similarity scores between the plurality of domains are exposed to provide domain similarity services.

15. A computing system comprising:
at least one processor; and
one or more memory devices communicative with the at least one processor, wherein the one or more memory devices store instructions to cause the at least one processor to:
retrieve a plurality of files associated with a plurality of domains;
generate a corpus including a plurality of integrated domain files corresponding to the plurality of domains based on integrating the plurality of files associated with the plurality of domains;
determine similarity scores between the plurality of domains based on the generated corpus, wherein a similarity score from the similarity scores between a first domain and a second domain from the plurality of domains is determined based on a geometric distance between the two domains in a vector space defined by corresponding two integrated domain files from the corpus;

persist the similarity scores between the plurality of domains in a repository to enable information retrieval during translating data between different languages; and when there is no data available for translating received data in a requested domain, search into a different domain from the plurality of domains associated with high similarity score to the requested domain, according to the persisted similarity scores, to provide a semantically coherent translation for the received data with the requested domain.

16. The computing system of claim 15, further comprising instructions to:

receive the input data associated with an application under development, wherein the input data comprises the data in a first language to be translated to a second language in the requested domain, wherein the retrieved plurality of files is extracted from property files associated with the application, and wherein the data to be translated has different meaning in the requested domain compared to at least one other domain from the plurality of domains;

identify one or more similar domains corresponding to the domain based on the similarity scores between the plurality of domains in the repository when the translation for the data in the second language does not exists in the domain, wherein the one or more similar domains are semantically coherent to the requested domain; and provide translation of the data in the second language based on searching into the one or more similar domains.

17. The computing system of claim 16, wherein when translation for the data in the second language exists in the domain associated with the input data, provide the translation of the data in the second language corresponding to the requested domain.

18. The computing system of claim 15, further comprising instructions to:

delete duplicate data from the retrieved plurality of files to generate the plurality of integrated domain files correspondingly associated with the plurality of domains.

19. The computing system of claim 15, wherein the geometric distance is cosine similarity, string similarity, or topical similarity, wherein the vector space is created based on selection and conversion of words included in lists of words present in the integrated domain files into dimensions in the vector space, wherein the plurality of integrated files correspondingly associated with the plurality of domains are represented as vectors in the vector space, and wherein the similarity score between the two domains is determined according to the geometric distance of two vectors in the vector space corresponding to the two domains.

20. The computing system of claim 15, wherein the persisted similarity scores between the plurality of domains are exposed to provide domain similarity services.

* * * * *